March 20, 1928. 1,663,015
J. MADER
CLUTCH
Filed June 20, 1919 4 Sheets-Sheet 2

Inventor
JOSEPH MADER.
By Paul Haul
his Attorneys.

March 20, 1928.
J. MADER
CLUTCH
Filed June 20, 1919
4 Sheets-Sheet 3
1,663,015
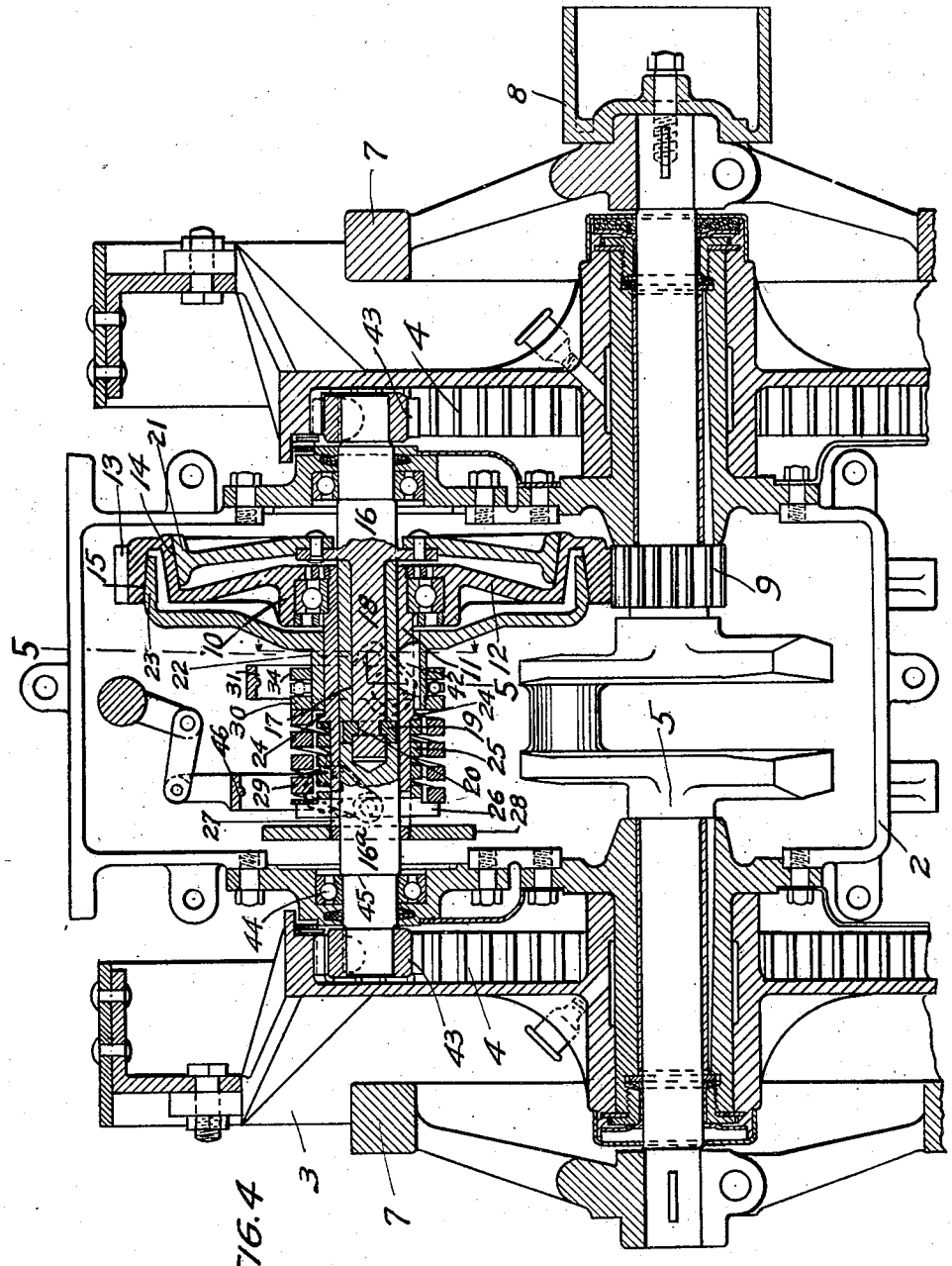
Inventor
JOSEPH MADER
By Paul Paul
his Attorneys.

March 20, 1928.

J. MADER

CLUTCH

Filed June 20, 1919

1,663,015

4 Sheets-Sheet 4

Inventor
JOSEPH MADER
By
his Attorneys.

Patented Mar. 20, 1928.

1,663,015

UNITED STATES PATENT OFFICE.

JOSEPH MADER, OF MINNEAPOLIS, MINNESOTA, ASSIGNOR, BY MESNE ASSIGNMENTS, TO NEW BEEMAN TRACTOR COMPANY, OF MINNEAPOLIS, MINNESOTA, A CORPORATION OF MINNESOTA.

CLUTCH.

Application filed June 20, 1919. Serial No. 305,474.

The object of my invention is to provide a clutch mechanism designed particularly for traction machines to transmit power from the engine to the traction wheels and so constructed that either one or both wheels may be driven from such power.

A further and particular object is to provide a clutch mechanism having a controlling means which will enable the operator of the machine to easily and quickly manipulate the clutch elements and positively control the driving of either traction wheel.

A further object is to provide a clutch and control mechanism which, through its compact and simple construction, is particularly applicable to a tractor of the garden type that is steered by a person walking in the rear of the machine.

The invention consists generally in various constructions and combinations, all as hereinafter described and particularly pointed out in the claims.

Figure 1:
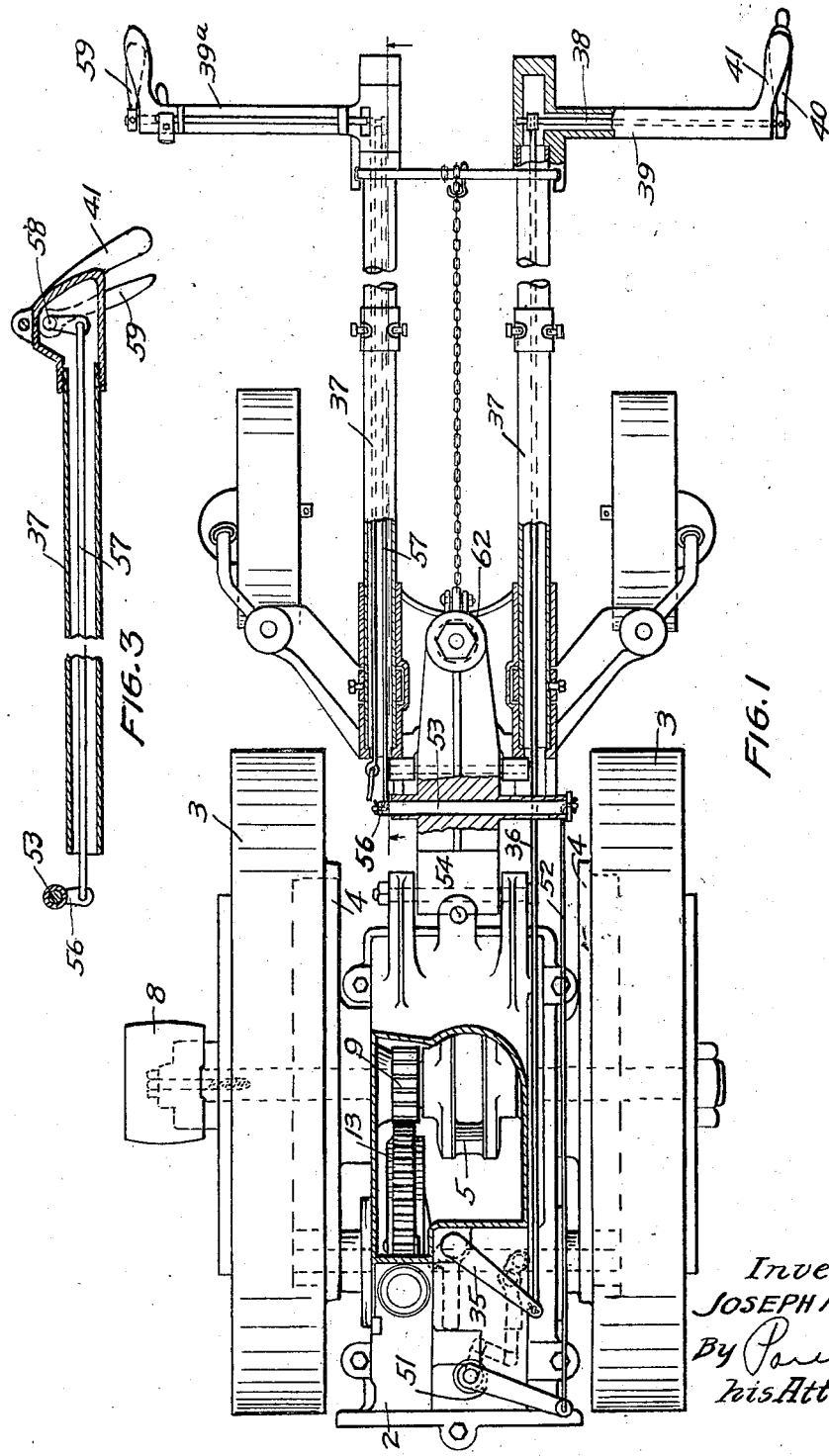
Figure 2:
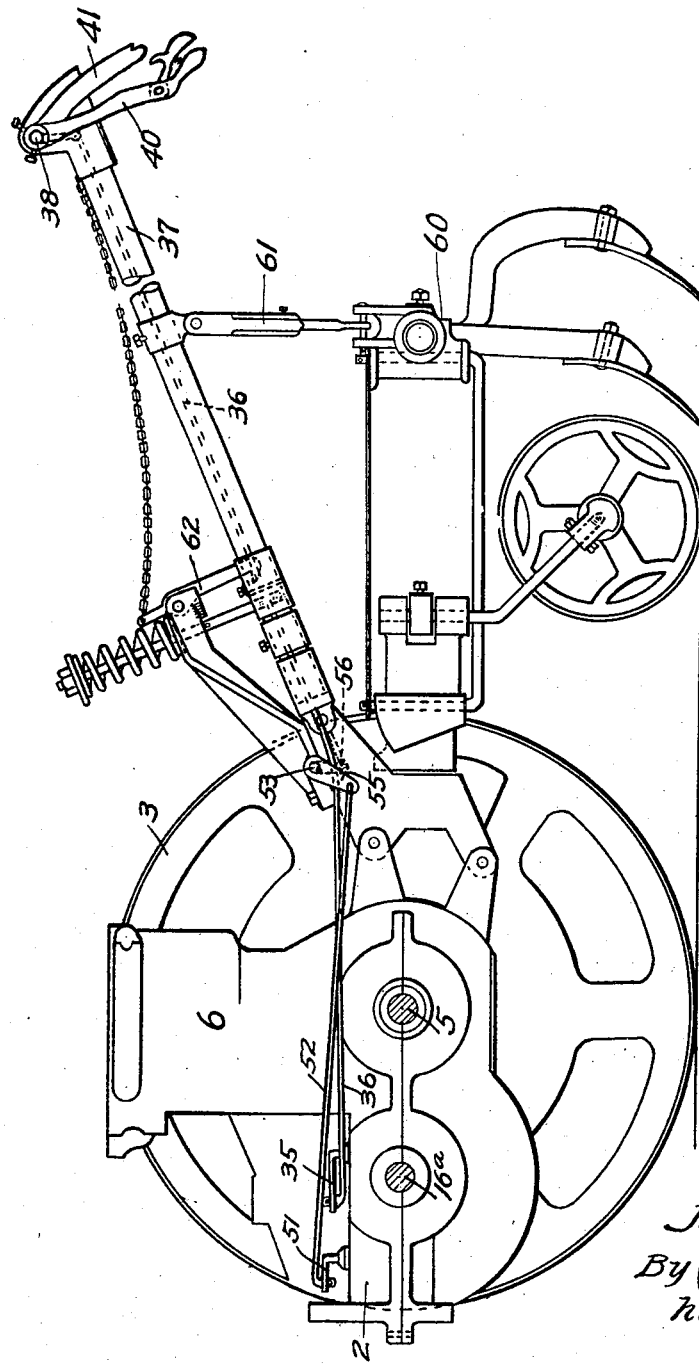
Figure 5:
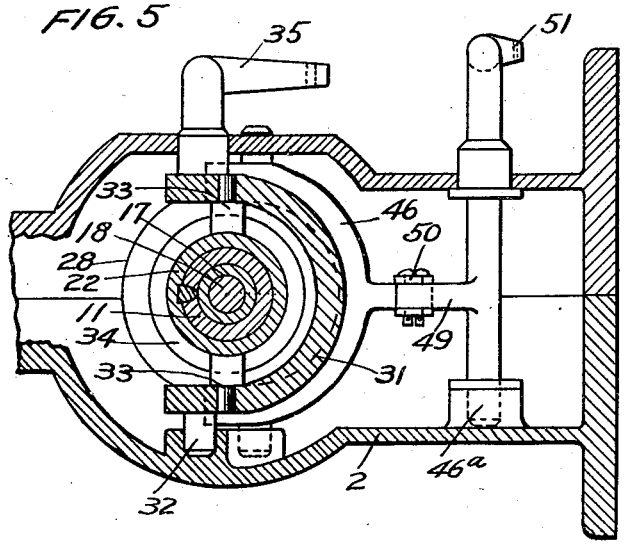
Figure 6:
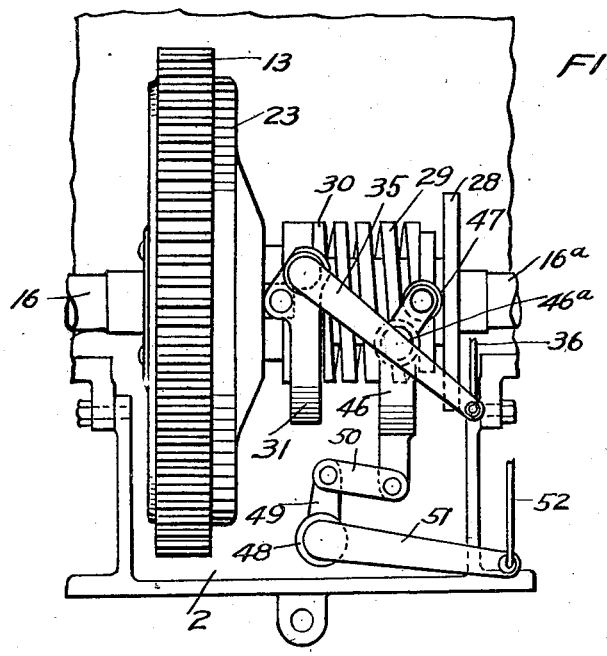

In the accompanying drawings forming part of this specification,

Figure 1 is a plan view of a traction machine with my invention applied thereto, Figure 2 is a vertical sectional view, showing the clutch control mechanism and the manner of mounting it in the steering post of the machine, Figure 3 is a detail of the clutch control mechanism and steering posts, Figure 4 is a horizontal sectional view, showing the manner of mounting the clutch and its operating mechanism and the driving connection with the crank shaft of the machine, Figure 5 is a vertical sectional view on the line 5—5 of Fig. 4, Figure 6 is a plan view showing in detail the lever mechanism for operating the clutch elements, In the drawing, 2 represents the frame of the machine. 3 are the traction wheels therefor, provided with internal gear rings 4. 5 is the crank shaft of the engine 6, mounted concentric with the hubs of the traction wheels and having fly wheels 7 and a pulley 8 for the transmission of power to some other mechanism. 9 is a pinion secured on the crank shaft 5 and 10 is a hub having a ball bearing on a sleeve 11 and provided with a radial flange 12 and gear ring 13 which meshes with the teeth of the pinion 9. This gear ring is in continuous mesh with the pinion to be revolved thereby. The flange 12 is provided with annular friction surfaces 14 and 15 encircled by the gear ring 13 and preferably integral therewith. A shaft composed of sections 16 and 16$^a$ carries the sleeve 11 and one shaft section has a socket 17 to receive a stud 18 formed on the other section, said stud being held against longitudinal movement in said socket by pins 19 which fit into an annular groove 20 provided in the surface of the stud. These pins, while preventing longitudinal movement of the shaft sections 16 and 16$^a$, allow them to revolve one upon the other freely. A friction shoe 21 is mounted on the shaft section 16 and has a peripheral surface to engage the friction surface 14 of the gear ring and a hub 22 mounted on the sleeve 11 has a friction shoe 23 positioned to engage the friction surface 15 of the gear ring. The sleeve 11 is free to slide for a limited distance on the supporting shaft section 16$^a$ to engage the friction surface 14 with the shoe 21 and the hub 22 has a limited movement on the sleeve 11 to engage the shoe 23 with the friction surface 15 or disengage it therefrom. A rib 24 is formed on the sleeve 11 and a coiled spring 25 is interposed between this rib and a pin 26 which is inserted through a socket in the shaft section 16$^a$, and also through a slot 27 in the sleeve 11 and near said pin on said sleeve is mounted a disc 28. A coiled spring 29 encircles the spring 25 and is interposed between the pin 26 and a collar 30 that is mounted on the hub 22. A yoke 31 has a bearing at 32 in the machine frame and is provided with pins 33 which bear on a ring 34 through which pressure is transmitted to the ring 30 to press the spring 29 against the pin 26 and withdraw the shoe 23 from contact with the friction surface 15. This yoke is oscillated by means of a crank 35 mounted concentric with the pin 32 and having a flexible connection 36 extending back through the machine frame and one of the steering posts 37 to a rod 38 that is mounted in one of the handle bars 39 and provided with an operating lever 40 adjacent the hand grip 41. The initial movement of the lever 35, as heretofore mentioned, compresses the spring 29 and releases the clutch shoe 23 which, through the sleeve 11, keyed to the hub 22 at 42, drives the shaft section 16ª and the pinion 43 which meshes with the internal gear ring of the traction wheel 3, the outward thrust movement of such section 16ª being taken up by the ball bearing 44 and the shoulder 45 on the shaft section. This movement of the clutch will stop the traction wheel 3 while the other wheel will continue to be driven.

We will assume now that the operator desires to stop both wheels and the machine. He will then move the lever 35 a little further, causing the hub 22 to contact with the rib 24 and move the sleeve 11 lengthwise on the shaft sections and disengaging the friction surface from the shoe 21 and thereupon the gear ring will run idle without transmitting power through either shoe to the traction wheels. Longitudinal movement of the sleeve 11 is permitted by reason of the slot 27 in the sleeve allowing the said sleeve to slide on the shaft section and be guided by the pin 26.

From the foregoing it is evident that initial movement of the hand grip 40 and the lever 35 disengages one friction shoe from the driving surface and continued movement of said lever disengages the driving surface from the other friction shoe, the gear ring sliding on the teeth of the driving pinion a sufficient distance to permit such movement and release of the shoes.

It is also desirable to provide a means for disengaging the friction surface 14 and the shoe 21 without first releasing the shoe 23. I therefore provide a yoke 46 mounted in the machine frame in a manner corresponding to the yoke 31 being pivoted at 46ª and having a bearing at 47 (see Figure 6) on the inner face of the disc 28. A post 48 has an arm 49 connected by a link 50 with the yoke and a lever 51 is formed on said post and projects outwardly through the machine casing and has a flexible connection 52 with a rock shaft 53 that is mounted transversely of the machine in a yoke 54 for the purpose of carrying the operating mechanism of this clutch to the other side of the machine. The flexible connection 52 is attached to a crank 55 on one end of the shaft 53 and at the other end of said shaft is a pin 56 and a flexible connection 57 extending to a rock shaft 58 in the handle bar 39ª and connected with the finger grip 59. When this finger grip is operated, the shaft 53 is rocked and movement transmitted to the lever 51 to operate the yoke 46 and exert an outward pressure on the disc 28 and move the sleeve 11 and the gear ring and its shoe 14 to disengage it from the shoe 21, the sleeve 11 sliding on the pin 26 by reason of the longitudinal slot in the sleeve through which said pin projects. I am thus able with these two clutch controls to disengage one member of the clutch and release one traction wheel from its drive by the initial movement of the clutch control and then by subsequent movement release the other traction wheel or by the movement of the other clutch control I can release one clutch shoe and one traction wheel without disturbing the driving connection between the other traction wheel and its shoe and the driving ring. The cultivator frame 60, the connection 61 with the steering posts and the lever device 62 for supporting the steering posts in their raised position are shown as parts of the machine but are not illustrated or described in detail, as they form no part of my present invention, being merely embodied in the general illustration to show the general principles of the tractor.

I claim as my invention:

1. A traction machine comprising a frame, a source of motive power thereon, traction means for said frame, a crank shaft operated from said source of motive power, a gear having a driving connection with said crank shaft and provided with clutching surfaces, clutch members having independent driving connection with said traction means and mounted to engage said clutch surfaces respectively for driving said traction means from said gear, a steering device for said frame, a hand grip mounted on said steering device and mechanism connected with said hand grip for positively releasing one of said clutch members and subsequently positively releasing the other member.

2. A traction machine comprising a frame, a source of motive power thereon, traction wheels for said frame, a crank shaft operated from said source of motive power, a gear having a driving connection with said crank shaft and provided with opposing friction surfaces, clutch members having independent driving connections with said traction wheels and mounted to engage said friction surfaces respectively, and a primary clutch control mounted to initially release one clutch member and subsequently release the other member, and a secondary clutch control mounted to release said subsequently operated clutch member independently of said initially operated clutch member.

3. A clutch comprising a driven gear having friction surfaces, friction members for engaging said surfaces and shaft sections connected respectively with said friction members, and a control mechanism mounted on its initial movement to positively disengage one friction member from its friction surface and on its subsequent movement disengage the other friction member from its friction surface, a traction machine wherein said clutch is mounted, a steering post for said traction machine, a hand grip mounted on said steering post within convenient reach of the machine operator and means connecting said hand grip with said friction member control mechanism.

4. A clutch comprising a driven gear having friction surfaces, friction members for engaging said surfaces and shaft sections connected respectively with said friction members, and a control mechanism mounted on its initial movement to positively disengage one friction member from its friction surface and on its subsequent movement positively disengage the other friction member from its friction surface, and mechanism mounted to release said subsequently released friction member without disengaging said initially released friction member.

5. A clutch comprising a driven gear having friction surfaces, a sleeve whereon said gear is loosely mounted, a clutch member mounted to engage one of said friction surfaces, a second clutch member mounted to engage the other friction surface, concentrically arranged springs for normally holding said clutch members in contact with said friction surfaces, and a clutch control mounted on its initial movement to compress one of said springs and release one of said clutch members and on its subsequent movement to compress the other spring and release the other clutch member.

6. A clutch comprising a driven gear having friction surfaces, a sleeve whereon said gear is loosely mounted, a clutch member mounted to engage one of said friction surfaces, a second clutch member mounted to engage the other friction surface, concentrically arranged springs for normally holding said clutch members in contact with said friction surfaces, and a clutch control mounted on its initial movement to compress one of said springs and release one of said clutch members and on its subsequent movement to compress the other spring and release the other clutch member, and a secondary clutch control for initially releasing said other clutch member independently of such first operated clutch member.

7. A clutch comprising differential shaft sections, pinions mounted thereon, a clutch member secured to one of said shaft sections, a sleeve loosely mounted on the other shaft section, a disc mounted on said sleeve, a pin passing through said other shaft section and through slots provided in said sleeve for allowing longitudinal movement of said sleeve on said shaft section, said sleeve having a rib thereon, a coiled spring interposed between said pin and rib, a second clutch member loosely mounted on said sleeve, a spring interposed between said second clutch member and said pin, a gear loosely mounted on said sleeve between said clutch members and having friction surfaces for engagement with said clutch members, said springs normally holding said clutch members in engagement with said friction surfaces, a driving pinion meshing with said gear, a primary clutch control mounted on its initial movement to compress one of said springs and release one of said clutch members and on its subsequent movement to compress the other spring and release the other clutch member, and a secondary clutch control mounted to engage said disc and release one of said clutch members independently of the other clutch member.

8. A traction machine comprising a frame and traction means therefor, a source of motive power mounted on said frame having driving connections with said means and primary and secondary clutches for controlling said driving connections, steering posts mounted on said frame having hand grips and levers mounted thereon, means connecting one of said levers through its steering post with said primary clutch, a pin mounted transversely in said frame to rock therein and connected at one end with said secondary clutch and having means for connection at its opposite end with the lever of the other steering post hand grip.

9. A traction machine comprising a frame and traction means therefor, a source of motive power mounted on said frame and having driving connections with said means, and primary and secondary clutches for controlling said driving connections, steering posts mounted on said frame and having hand grips and levers mounted thereon, means connecting one of said levers through its steering post with one of said clutches and means mounted transversely of said frame to rock therein and connected with the other clutch and having means for connection with the other steering post lever.

10. A clutch comprising a driven gear having friction surfaces, a sleeve whereon said gear is loosely mounted, a clutch member mounted to engage one of said friction surfaces, a second clutch member mounted to engage the other friction surface, springs for normally holding said clutch members in contact with said friction surfaces, and a clutch control mounted on its initial movement to compress one of said springs and release one of said clutch members and on its subsequent movement to compress the other spring and release the other clutch member.

In witness whereof, I have hereunto set my hand this 7" day of June, 1919.

JOSEPH MADER.